United States Patent
Fields et al.

(10) Patent No.: US 6,468,495 B1
(45) Date of Patent: Oct. 22, 2002

(54) TREATMENT OF MOLTEN SALT REPROCESSING WASTES

(75) Inventors: Mark Fields, Askam-in-Furness; Robert Charles Thied, Seascale; Kenneth Richard Seddon, Belfast; William Robert Pitner, Belfast; David William Rooney, Belfast, all of (GB)

(73) Assignee: British Nuclear Fuels PLC, Cheshire (GB)

( * ) Notice: Subject to any disclaimer, the term of this patent is extended or adjusted under 35 U.S.C. 154(b) by 0 days.

(21) Appl. No.: 09/508,324

(22) PCT Filed: Sep. 16, 1998

(86) PCT No.: PCT/GB98/02743
§ 371 (c)(1),
(2), (4) Date: Oct. 20, 2000

(87) PCT Pub. No.: WO99/14160
PCT Pub. Date: Mar. 25, 1999

(30) Foreign Application Priority Data

Sep. 16, 1997 (GB) .............................................. 9719551

(51) Int. Cl.⁷ .............................................. C01D 3/18
(52) U.S. Cl. .................................. 423/499.1; 423/499.3; 423/499.5; 423/21.1; 423/155; 423/179; 423/253; 376/311; 376/360
(58) Field of Search .......................... 423/499.1, 499.3, 423/499.4, 499.5, 491, 21.1, 155, 179, 253; 376/311, 360

(56) References Cited

U.S. PATENT DOCUMENTS

| | | | | |
|---|---|---|---|---|
| 5,171,649 A | * | 12/1992 | Vaughn | 429/112 |
| 5,336,450 A | | 8/1994 | Ackerman et al. | 423/21.1 |
| 5,774,815 A | * | 6/1998 | Christian et al. | 588/18 |
| 5,994,602 A | * | 11/1999 | Abdul-Sada et al. | 585/456 |

FOREIGN PATENT DOCUMENTS

| | | |
|---|---|---|
| WO | WO 95/21806 | 8/1995 |
| WO | WO 95/21871 | 8/1995 |
| WO | WO 95/21872 | 8/1995 |
| WO | WO 98/06106 | 2/1998 |

OTHER PUBLICATIONS

Chauvin et al.; "A Novel Class of Versatile Solvents for Two–Phase Catalysis: Hydrogenation, Isomerization, and Hydroformylation of Alkenes Catalyzed by Rhodium Complexes in Liquid 1,3–Dialkylimidazolium Salts" *Angew. Chem. Int. Ed. Engi.* 34:23124 2698–2700 (1995) No month.

Heerman et al.; "Electrochemistry and Spectroscopy of Uranium in Basic $AlCl_3$+N–(n–Butyl)Pyridinium Chloride Room Temperature Molten Salts" *J. Electroanal. Chem.* 193 289–294 (1985) No month.

E.S. Lane; "Quaternary Ammonium Nitrates. Part I. Preparation from Alkyl Nitrates and from $\alpha\omega$–Polymethylene Dinitrates" *J. Chem. Soc.* 1172–1175 (1953) No month.

Wilkes et al.; "Air and Water Stable 1–Ehyl–3–methylimidazolium Based Ionic Liquids" *J. Chem. Soc. Chem. Commun.* 965–967 (1992) No month.

Seddon; *Ionic Liquids for Clean Technology*, J. Chem. Tech. Biotechnol. 68:351–356 (1997) No month.

International Search Report, PCT/GB98/02743. Nov. 1998.

* cited by examiner

Primary Examiner—Ngoc-Yen Nguyen
(74) Attorney, Agent, or Firm—Myers Bigel Sibley & Sajovec (57) ABSTRACT

A method of removing from a metal salt ionic species contained therein involves contacting the metal salt with an ionic liquid to dissolve the metal salt, the ionic species or both. At least in the case where both the metal salt and the ionic species are dissolved, the resultant ionic liquid composition is treated to separate the ionic species therefrom and subsequently processed to recover the metal salt.

19 Claims, 6 Drawing Sheets

TREATMENT OF MOLTEN SALT REPROCESSING WASTES

This invention relates to the treatment of salts and, more particularly, the treatment of salts previously used in molten form in the reprocessing and treatment of nuclear materials.

Molten salts are known for their use as solvents and they have in fact been proposed for use in the reprocessing or treatment of irradiated fuels from light water reactors (LWRs) and fast reactors. In such a method, an irradiated fuel is dissolved into molten alkali metal chlorides. The dissolved uranium and plutonium species are extracted from the salt and, optionally, processed into fuel, and the molten salt is re-used. Eventually the molten salt becomes significantly contaminated with fission products which must be removed before the salt can be re-used. One process which uses molten salts for reprocessing irradiated fuel uses lithium chloride/potassium chloride eutectic [{LiCl+KCl} eutectic] and another uses sodium chloride/potassium chloride eutectic [{NaCl+KCl} eutectic]. When used herein, the term "molten salt" refers to a salt, or a mixture of salts, having inorganic cationic and anionic species, and having a melting point in excess of 100° C., usually at least 300° C. The term "metal salt", when used herein, refers to a material which gives rise to a molten salt when melted. In addition to chloride salts such as those mentioned above, other molten salts with which this invention may be concerned include fluorides and carbonates.

Recently, salts, mixtures of salts, or mixtures of components which produce salts, which melt below or just above room temperature have become known. (In the terms of this invention, a salt consists entirely of cationic and anionic species). Such liquids are known as "ionic liquids" although this term can be used for salts which melt at relatively high temperatures, including for example temperatures of up to 100° C. They normally include at least an organic cation. Common features of ionic liquids include a zero vapour pressure at room temperature, a high solvation capacity and a large liquid range (for instance, of the order of 300° C.).

When used herein, the term "ionic liquid" refers to a salt, a mixture of salts, or a mixture of components which produce salts and which melts at a temperature up to 100° C. and/or includes an organic cation.

Other ionic liquids are, for example, nitrates, fluoroborates, ethanoates or hexafluorophosphates, of which nitrates and fluoroborates are discussed in PCT/GB97/02057,. Mixtures of any of the previously described ionic liquids may likewise be used.

Known ionic liquids include halides such as an imidazolium halide, a pyridinium halide or a phosphonium halide as well as such materials in combination with, for instance, a metal halide such as aluminium chloride. Examples of ionic liquids include 1-ethyl-3-methylimidazolium chloride, N-butylpyridinium chloride, tetrabutylphosphonium chloride and a mixture of 1-ethyl-3-methylimidazolium chloride and aluminium(III) chloride.

E. S. Lane, *J. Chem. Soc.* (1953), 1172–1175 describes the preparation of certain alkylpyridinium nitrate ionic liquids, including sec-butylpyridinium nitrate. No use of the liquids is mentioned but reference is made to the pharmacological activity of decamethylenebis(pyridinium nitrate).

Ionic liquids based on various anions, including nitrate, fluoroborate and ethanoate, are disclosed by J S Wilkes et al.,*J. Chem. Soc. Chem. Commun.,* 965–967 (1992). The use as solvents for catalysis of ionic liquids based on non-nucleophilic ions such as tetrafluoroborate and hexafluorophosphate is described by Y. Chauvin et al., *Angew. Chem. Int. Edit. Engl.,* 34, 2698–2700 (1995).

L. Heerman et al.,*J. Electroanal. Chem.,* 193, 289 (1985) describe the dissolution of $UO_3$ in a system comprising N-butylpyridinium chloride and aluminium(III) chloride.

WO 95/21871, WO 95/21872 and WO 95/21806 relate to ionic liquids and their use to catalyse hydrocarbon conversion reactions (e.g. polymerisation or oligomerisation of olefins) and alkylation reactions. The ionic liquids are preferably 1-($C_1$–$C_4$ alkyl)-3-($C_6$–$C_{30}$ alkyl) imidazolium chlorides and especially 1-methyl-3-$C_{10}$ alkyl-imidazolium chloride, or 1-hydrocarbyl pyridinium halides, where the hydrocarbyl group is for example ethyl, butyl or other alkyl.

The present invention provides a method of removing from a metal salt ionic species therein, which method comprises contacting the metal salt with an ionic liquid to dissolve the metal salt, the ionic species or both, thereby to form a resultant ionic liquid composition and, at least in the case where both the molten salt and the ionic species are dissolved, said ionic liquid composition is treated to separate the ionic species therefrom and subsequently processed to recover the metal salt.

The method of the invention has the advantage that it can be performed at relatively low temperatures (e.g. of about 50° C. or less), for example at temperatures at or close to room temperature.

The ionic species with which this invention is concerned include ions of fission products, minor actinides, activation products, corrosion products, fuel additives and process additives.

The metal salt is preferably an alkali metal halide or a mixture of alkali metal halides, for example a mixture of lithium chloride and potassium chloride or a mixture of sodium chloride and potassium chloride. Such alkali metal halide mixtures are suitably eutectics.

The species removed from the metal salt may comprise fission product ions, for example as their chlorides, fluorides or nitrates. Exemplary fission products include Cs, Sr, Ba and those of the actinides and lanthanides. The invention is particularly concerned with methods in which the ionic species comprise cations of the lanthanides (for example Sm, Gd and Ce) and the metals Cs, Sr and Ba.

In preferred processes, the metal salt and the ionic species are dissolved in the ionic liquid and known techniques may be used to separate the dissolved products. Suitable separation techniques include salting out, electrochemical methods, precipitation and ion exchange. In one class of methods, the solution is treated to separate the ionic species, typically fission product chlorides, therefrom and subsequently processed to recover the metal salt.

Alternatively, a component from the metal salt and contaminant fission product mixture is dissolved in the ionic liquid. The presence of an insoluble component leads to the first step in the separation sequence.

In one preferred class of processes, LiCl+KCl or NaCl+KCl, in either case containing dissolved fission products, is contacted at, for example, room temperature with an ionic liquid system in which the alkali metal halides as well as fission products to be separated therefrom are soluble. The invention contemplates in particular ionic liquids containing an organic halide, optionally in combination with a metal halide such as aluminium(III) chloride; such ionic liquids include in combination with an imidazolium halide, a pyridinium halide or a phosphonium halide as well as these materials in combination with aluminium (III) chloride. Examples of organic halide ionic liquids include 1-ethyl-3-methylimidazolium chloride, N-butylpyridinium chloride and tetrabutylphosphonium chloride. Preferred ionic liquids include 1-ethyl-3-methylimidazolium chloride and a mixture of basic (that is, Franklin basic) 1-ethyl-3-methyl-imidazolium chloride and aluminium(III) chloride ("[emim]Cl—ACl$_3$"). Of course, the aforegoing ionic liquids may be used to dissolve salt compositions other than LiCl+KCl or NaCl+KCl.

A further preferred option is combining the ionic liquids to form a mixture, such as 1-ethyl-3-methyl-imidazolium chloride and 1-octyl-3-methyl-imidazolium chloride.

The composition of the [emim]Cl—AlCl$_3$ mixture determines whether the liquid has Franklin acidic, basic or neutral properties. A basic melt has an AlCl$_3$:[emim]Cl ratio<1.0, whilst an acidic melt has an AlCl$_3$:[emim]Cl ratio>1.0. A neutral melt has an AlCl$_3$:[emim]Cl ratio=1.0.

The invention will now be described in more detail primarily in relation to alkali metal halide salts previously used in reprocessing and contaminated with fission products. It will be understood, however, that the invention may equally be applied to other metal salts, especially to remove contaminants.

Thus, in the treatment of salt compositions resulting from reprocessing and treatment of nuclear materials, the ionic liquid (e.g. basic [emim]Cl—AlCl$_3$) may be used to dissolve one or more of the alkali metal halide[s] and/or (usually by complexing) the bulk of the fission product halides (normally chlorides). If the alkali metal halide component of the composition is relatively insoluble in the ionic liquid, as in the case of NaCl in basic [emim]Cl—AlCl$_3$, the fission products may be leached into solution. Such leaching is desirably aided by reducing the particle size by, for instance, mechanically dividing (e.g. crushing or grinding) the salt.

The ionic liquid mixture is then treated to separate the alkali metal halides from the fission products, for example by using one or more techniques known per se for separating solutes. Suitable separation procedures include salting out, other precipitation methods, ion exchange, and electrochemical separation. The fission products may not have been completely dissolved in the ionic solvent because, for instance, they may be "locked" within the particles of an insoluble component. A further washing step may be necessary in these circumstances. In such cases, the invention normally includes the decontaminating of such insoluble residues remaining after the dissolution of the alkali metal halide composition. Each of the foregoing procedures will now be considered in turn with specific reference to the treatment of reprocessing salt compositions.

Salting Out of Chlorides

A majority of radioactive fission product halides (but not Cs halides) have lattice energies, which are considerably greater than those of the alkali metal halides. Thus, when the salts have been dissolved in an ionic liquid the fission product chlorides may be precipitated by the addition of a species (for example toluene, benzene or other organic solvent) which makes the ionic liquid more like an organic solvent, thereby destabilising the fission product complexes: as the ionicity of the solution decreases a fission product Decontamination of Halides Insoluble in the Initial Ionic Liquid Solvent Halides not dissolved in the chosen ionic liquid may be treated to remove radioactive ions by contacting the undissolved residue with another ionic liquid composition. For example, halides not dissolved in the basic ionic liquid used in the initial dissolution may be treated to remove radioactive ions by contacting the undissolved residue with acidic [emim]Cl—AlCl$_3$, in which it may be dissolved. The radioactive ions (fission products) may be removed from the resulting solution by, for example, any of the separation techniques mentioned above, especially ion exchange.

Acidic [emim]Cl—AlCl$_3$ is not suitable for dissolving mixtures containing significant NaCl, because this ionic liquid reacts with NaCl to yield neutral, buffered [emim]Cl—AlCl$_3$ composition which will not dissolve fission product chlorides.

Acidic [emim]Cl—AlCl$_3$ may be used as solvent in other contexts. Moreover, irrespective is of the context, other acidic ionic liquids (e.g. those based on substituted imidazolium and/or containing AlCl$_3$) may be used in place of [emim]Cl—AlCl$_3$. Some preferred methods of the invention therefore involve dissolving a metal halide in an acidic ionic liquid.

The cleaned salt composition is then recovered from the ionic liquid and, if required, has its composition adjusted to the eutectic. In one variant, the cleaned salt composition is dissolved in water or another aqueous medium and then extracted with a water-insoluble ionic liquid (e.g. [bmim][PF$_6$], where [bmim]=1-butyl-3-methylimidazolium cation). The salt composition may then be re-used.

It will be appreciated, therefore, that the invention includes a method of removing radioactive contaminants from an alkali metal halide composition used in the reprocessing of nuclear fuel, comprising:
  (i) dissolving in an ionic liquid said contaminants to obtain an ionic liquid solution;
  (ii) separating said contaminants from the solution by precipitation, solvent extraction or electrochemical reduction;
  (iii) then optionally removing contaminants remaining in the solution by ion exchange; and
  (iv) recovering the alkali metal halide composition from the solution and, if necessary, adjusting its composition to the eutectic.

In some of these methods a residue comprising alkali and/or alkaline earth metal halides remains undissolved in the ionic liquid. The residue is dissolved in an acidic ionic liquid, especially acidic [emim]Cl—AlCl$_3$, to obtain a mixture from which contaminants are removed especially by precipitation or electrochemical reduction and/or by ion exchange.

Also included in the invention is the use of an ionic liquid as a solvent for an ionic composition in the selective removal from the dissolved composition of one or more species contained in the composition.

In order that the present invention may be more fully understood, examples will now be given by way of illustration only with reference to the accompanying drawings of which.

In order to show the effectiveness of the present invention a series of experiments were undertaken in order to determine the maximum amount of individual salts which could be dissolved by [emim]Cl. In these experiments 10 g of [emim]Cl was heated to 150° and small quantities (0.5 g) of LiCl, KCl and NaCl were added.

The mixture was stirred for a minimum of eight hours or until no solid remained. The results are given in table 1 below which gives the percentage by weight for each salt dissolved in the ionic liquid. The column headed mix refers to a eutectic mixture of LiCl and KCl.

TABLE 1

| Chloride | % Weight | | |
|---|---|---|---|
| | Run 1 | Run 2 | Mix |
| Sodium | 0.76 | 0.74 | — |
| Potassium | 0.19 | 0/17 | 0.24 |
| Lithium | 26.35 | 25.93 | 13.78 |

It can therefore be seen that LiCl is more soluble in [emim]Cl than KCl or NaCl.

In addition, it has been found that the addition of AlCl$_3$ to a mixture of LiCl and [emim]Cl results in the precipitation of LiCl. This allows the control of the LiCl solubility by the addition of AlCl$_3$.

Figure 1:
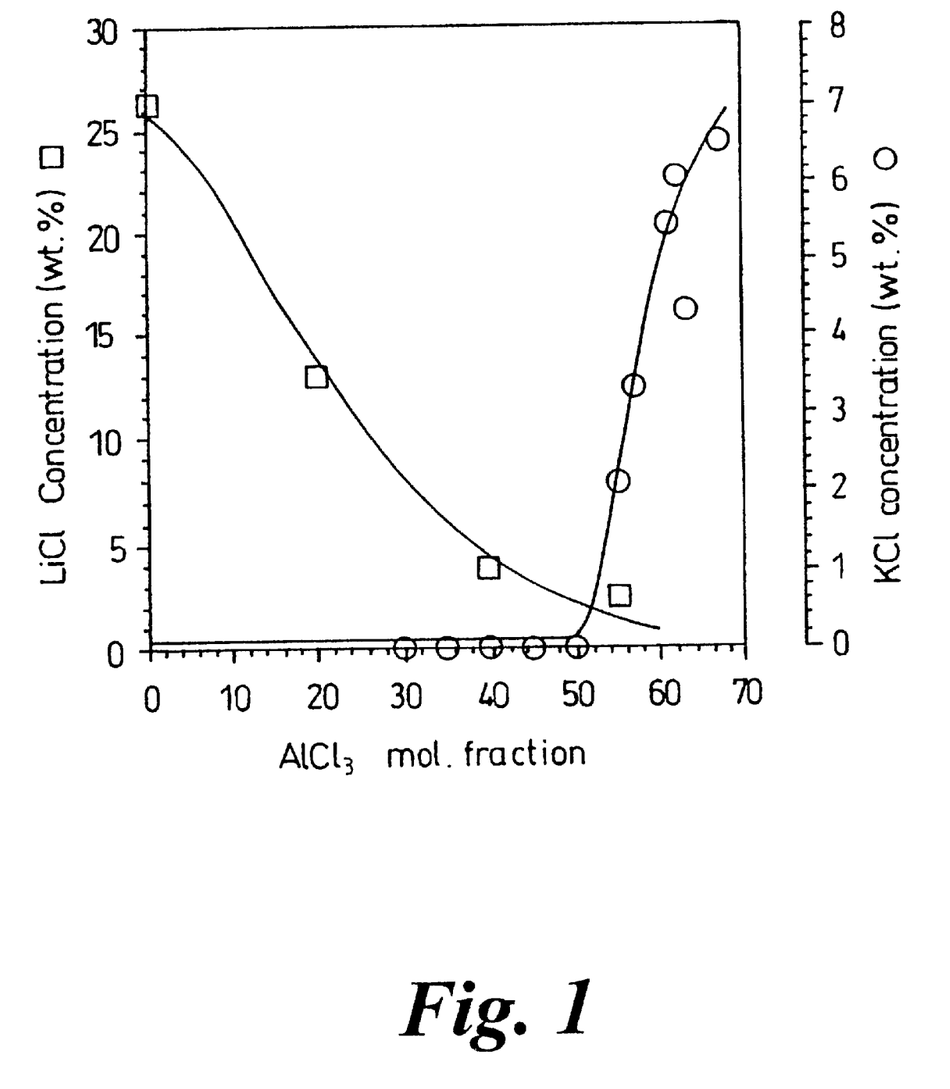
FIG. 1 is a graph illustrating the effect of changing the composition of AlCl$_3$ in the ionic liquid [emim]Cl—AlCl$_3$ on LiCl and KCl solubility.

FIG. 1 further shows that an increase in the concentration of AlCl$_3$ in the ionic liquid [emim]Cl decreases the solubility of LiCl and in addition, if the concentration of AlCl$_3$ is further increased, the solubility of KCl increases.

Figure 2:
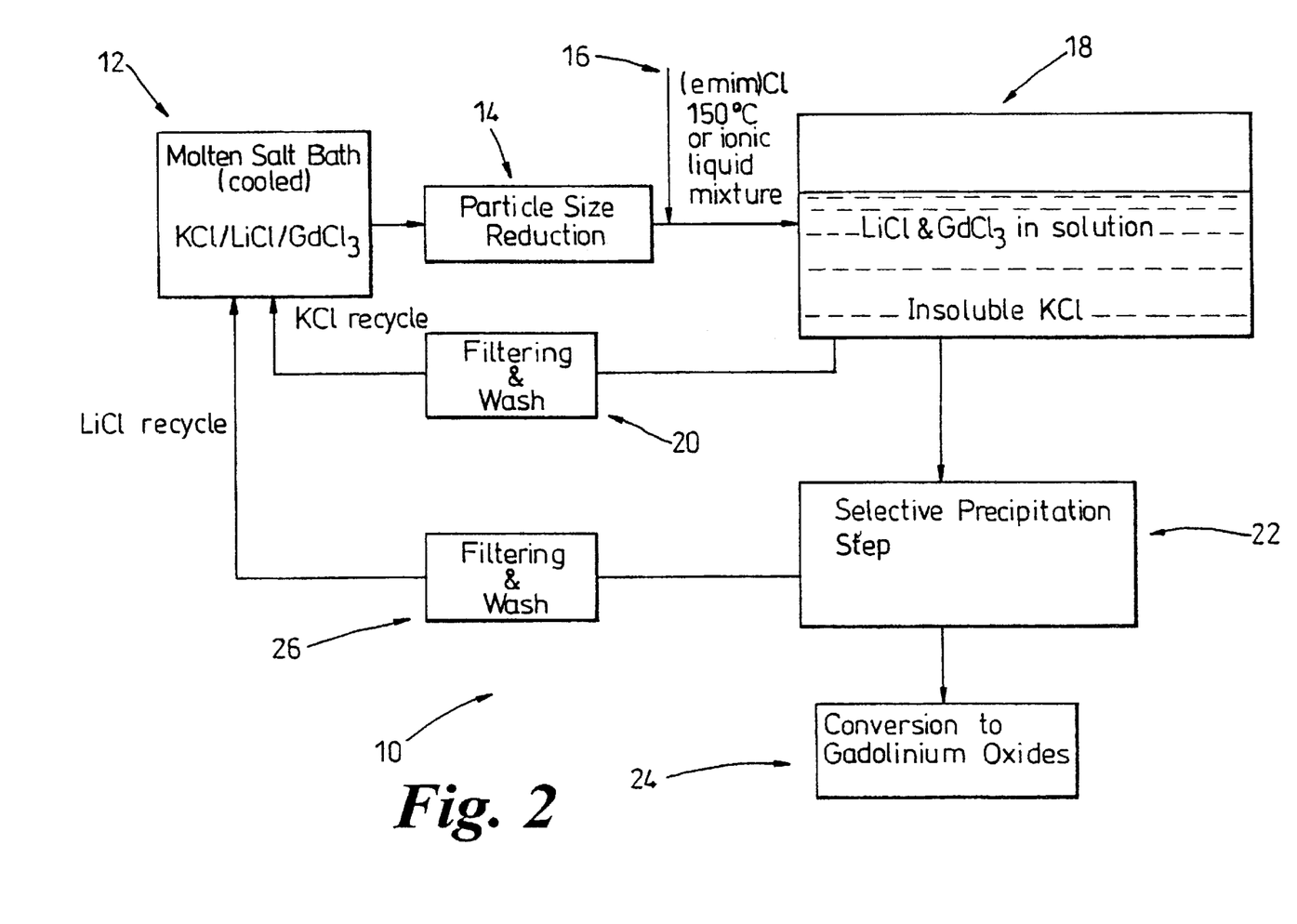
FIG. 2 is a flowsheet diagram illustrating a process for the extraction of metal chloride from a molten salt mixture using [emim]Cl.

Referring to FIG. 2, the flow sheet schematic diagram 10 shows a process for the removal of metal chloride ionic species in this case gadolinium chloride from a salt mixture. The molten salt mixture of KCl, LiCl and GdCl$_3$ is placed in a bath 12 and cooled to a solid.

The solid is removed to a particle size reduction vessel 14 and from there it is combined with the ionic liquid [emim]Cl and added to a reaction vessel 18 in which LiCl and GdCl$_3$ dissolve in [emim]Cl and KCl is present as an insoluble solid. The insoluble KCl is removed from reaction vessel 18 to filter 20 where it is filtered, washed and then recycled to the reprocessing plant. LiCl and GdCl$_3$ are then removed into reaction vessel 22. The gadolinium may be removed by electrodeposition and hence extraction from the lithium, or by, for instance, precipitation of a gadolinium phosphate by the addition of a phosphate precursor.

The LiCl can then be removed from the ionic liquid using an organic solvent. The LiCl is then clean and the organic solvent can be removed from the ionic liquid by evaporation and can be sent for re-use at the reprocessing plant. Both the ionic liquid and the molten salt can then be recycled to this extractor process.

Figure 3:
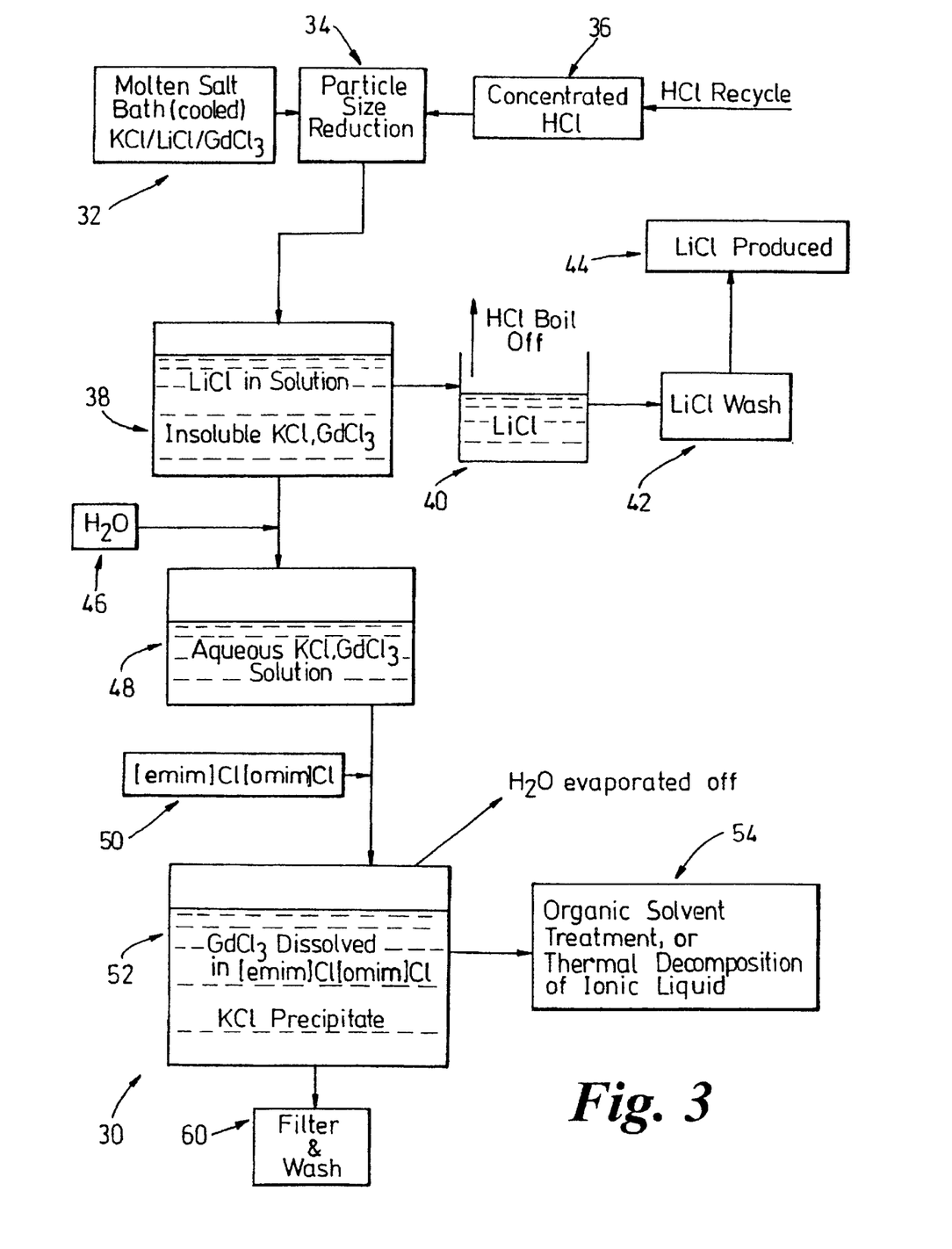
FIG. 3 is a flowsheet diagram illustrating a process for the extraction of metal chloride from a molten salt mixture using concentrated HCl and an [emim]Cl/[omim]Cl mixture.

Referring to FIG. 3, the flow sheet schematic diagram 30 shows a process for the removal of metal chlorides ionic species, in this case gadolinium chloride from a salt mixture. The molten salt mixture comprising KCl, LiCl and GdCl$_3$ is cooled in a bath 32, the solid mixture is then sent for particle size reduction in the particle size reduction vessel 34. From here the mixture is passed to vessel 38, concentrated HCl 38 being added to dissolve LiCl. As an alternative to the use of HCl, methanol may be used. The resultant LiCl solution is separated from KCl and GdCl$_3$ by filtration, both being insoluble in concentrated HCl in the separation vessel 38. The LiCl solution is removed to an evaporator 40 where the concentrated HCl is evaporated off and reused. The LiCl is then washed 42 and can then be sent for recycle in the reprocessing plant. The KCl and GdCl$_3$ are dissolved in water 46 and a mixture of the ionic liquids [emim]Cl and [omim]Cl are added 50 to the solution 48.

The resultant mixture is added to vessel 52 in which the water is evaporated off, causing the formation of a KCl precipitate and leaving GdCl$_3$ dissolved in the ionic liquid. GdCl$_3$ is recovered by addition of an organic solvent such as chloroform at 54. The GdCl$_3$ can thus be filtered off and sent to a further vessel for conversion to oxide. The organic solvent can be removed from the ionic liquid mixture by distillation. The ionic liquid which remains can be recycled in the process by adding at 50. All solvents are thus recycled. LiCl and KCl are now clean and can be returned to the reprocessing plant.

Figure 4:
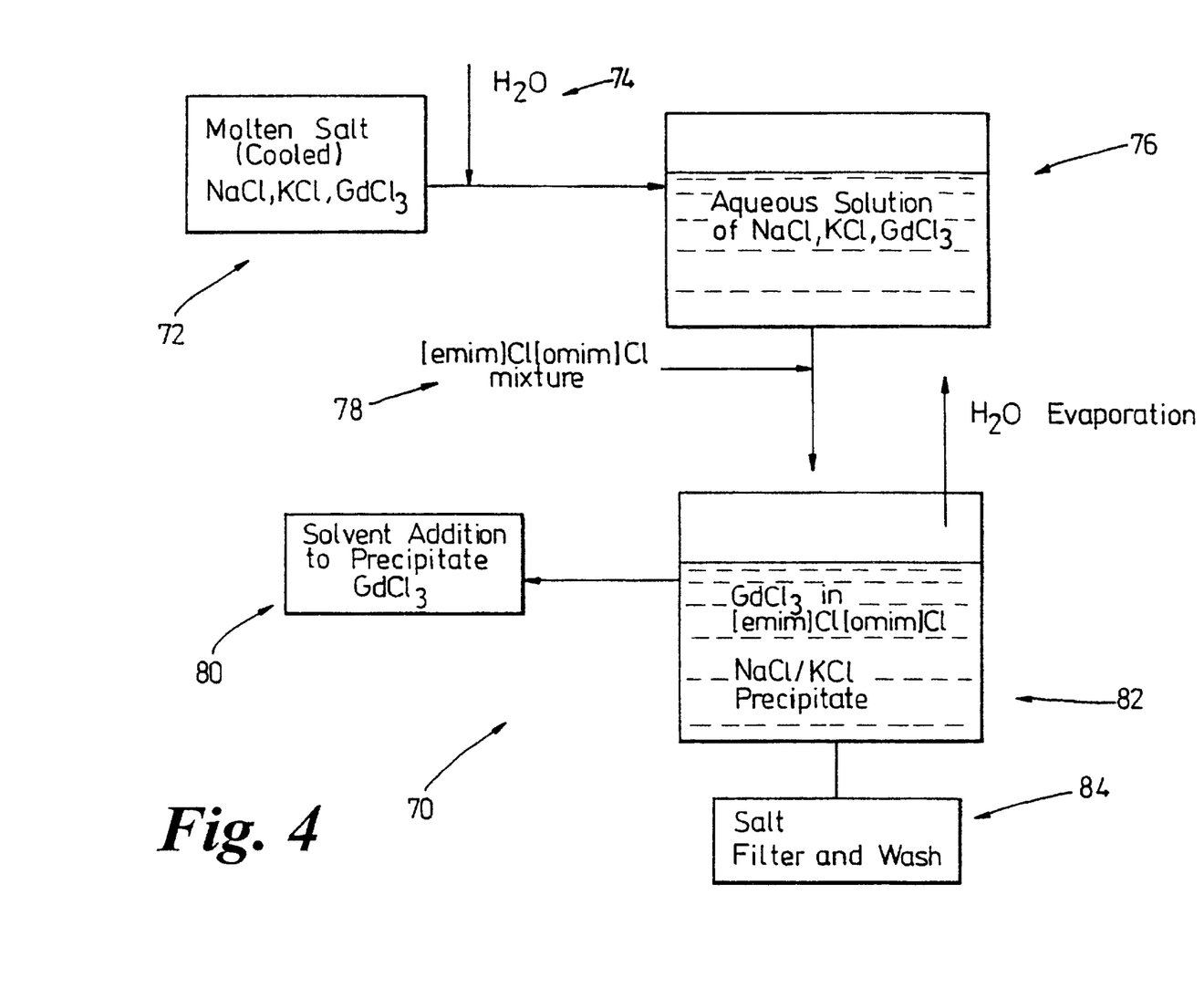
FIG. 4 is a flowsheet diagram illustrating a process for the extraction of metal chloride from a molten salt mixture using water and an [emim]Cl/[omim]Cl mixture.

Referring to FIG. 4, the flow sheet schematic diagram 70 shows a process for the removal of metal chlorides from a salt mixture comprising NaCl, KCl and GdCl$_3$. The cooled molten salt 72 first passes through a particle reduction step. The salt is then combined with water 74. At this stage any insoluble products are filtered off. To the resultant aqueous solution 76 is added a mixture of the ionic liquids [omim]Cl and [emim]Cl 78. The water is evaporated off from this mixture. The GdCl$_3$ is soluble in the ionic liquid mixture but the NaCl and KCl are insoluble. As this water is removed, the NaCl and KCl precipitate from the mixture and are passed to vessel 84 for working with an organic solvent. The GdCl$_3$ is separated from the ionic liquid using an organic solvent such as chloroform. The GdCl$_3$ is then sent to vessel for oxide conversion, in readiness for vitrification. The organic solvent is removed from the ionic liquid by distillation. Thus both the ionic liquid and the organic solvent can be recycled to the process (point 78 for the ionic liquid). NaCl and KCl can now be recycled to the reprocessing plant.

Figure 5:
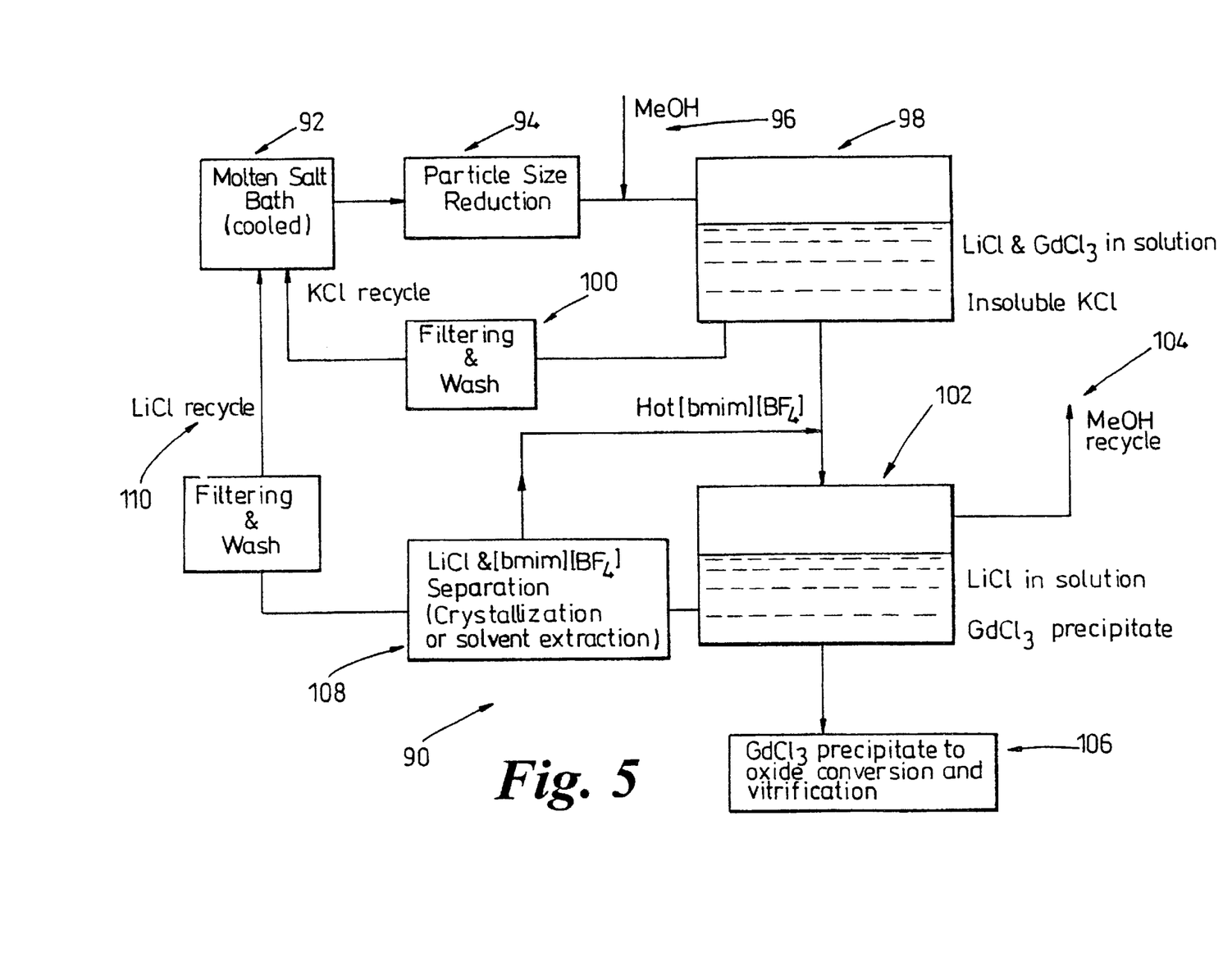
FIG. 5 is a flowsheet diagram illustrating a process for the extraction of metal chloride from a molten salt mixture using methanol and 1-butyl-3-methylimidazolium tetrafluoroborate ([bmim][BF$_4$]).

Referring to FIG. 5, the flowsheet schematic diagram 90 shows a process for the removal of metal chlorides from a salt mixture comprising NaCl, KCl and GdCl$_3$. Salt from the molten salt bath 92 is first cooled, then sent for mechanical particle size reduction 94. Methanol 96 is then used as a solvent, dissolving LiCi and GdCl$_3$ chlorides, but leaving behind KCl in vessel 98. The KCl can be filtered, washed in an organic solvent 100, and returned to the molten salt bath 92. The LiCl/GdCl$_3$ solution is then treated with another ionic liquid such as hot 1-butyl-3-methylimidazolium tetrafluoroborate, [bmim][BF$_4$] (140° C.) in vessel 102. The methanol is distilled off 104, and returned to the first dissolution step 96. LiCl will be soluble in the hot [bmim][BF$_4$] whereas GdCl$_3$ will form a precipitate. The GdCl$_3$ precipitate can be filtered off 106, sent to oxide conversion, and vitrification.

The LiCl could be precipitated from the [bmim][BF$_4$] by saturation of the solution 108, followed by cooling and filtering off the solid LiCl 110. The [bmim]Cl can then be recycled to the process. This process has the advantage that all solvents are thus recycled.

Figure 6:
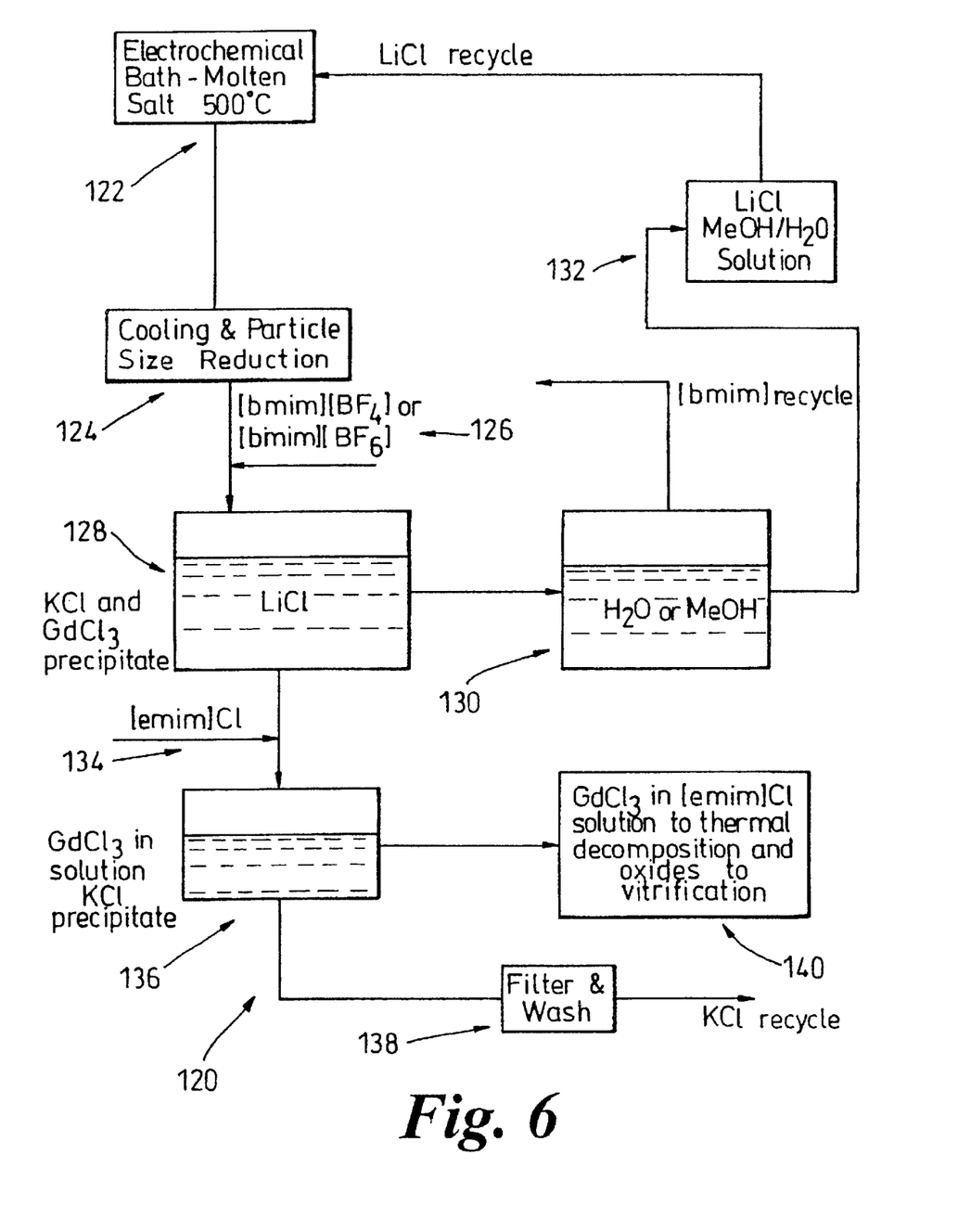
FIG. 6 is a flowsheet diagram illustrating a process for the extraction of metal chloride from a molten salt mixture using 1-butyl-3-methylimidazolium hexafluorophosphate ([bmim][PF$_6$]) and [emim]Cl.

Referring to FIG. 6, the flowsheet schematic diagram 120 shows a process for the removal of metal chlorides from a salt mixture comprising NaCl, KCl and GdCl$_3$. Salt form the molten salt bath 122 is first cooled, then sent for mechanical particle size reduction 124. The salt particles are then dissolved in an ionic liquid [bmim][BF$_4$] 126 which dissolves LiCl in vessel 128. The remaining solid KCl and GdCl$_3$ can be filtered off, and sent to the next stage. The LiCl solution in [bmim]Cl, is then contacted with water or methanol 130, to extract the lithium chloride 132, and the [bmim]Cl can be recycled to the process. The KCl and LnCl$_3$ solids are mixed with an ionic liquid such as [emim]Cl 134, into which the GdCl$_3$ will dissolve 136. The insoluble KCl precipitate can be filtered off, washed and dried and returned to the molten salt bath 138. The gadolinium laden ionic liquid stream, can be thermally decomposed to leave the oxides for vitrification 140.

The method of the present invention may also be used for the extraction of more than one lanthanide salt or other fission products from a eutectic mix. For example, a eutectic mixture comprising 45 g LiCl and KCl, 2.5 g $SmCl_3$ and 2.5 g $GdCl_3$ was combined with 45 g of methanol or 45 g of concentrated hydrochloric acid and stirred for eighteen hours. The sample was then filtered and the resulting solids were collected and dissolved in 50 g distilled water. In addition 5 g of [emim]Cl and 5 g of [omim]Cl were added to the aqueous solution. The sample was then heated to 100° C. for 1 hour and subsequently allowed to cool. 20 g of methanol was added and the mixture was filtered, the methanol was extracted from the resultant liquid to leave a liquid comprised of [emim]Cl, [omim]Cl $SmCl_3$ and $GdCl_3$.

A similar method was used to extract $SmCl_3$ and $GdCl_3$ from KCL and NaCl.

What is claimed is:

1. A method of removing ionic species from a metal salt, which method comprises contacting the metal salt with an ionic liquid to dissolve the metal salt, the ionic species or both, thereby to form a resultant ionic liquid composition and separating or recovering the metal salt from the ionic liquid composition, and optionally, when both the metal salt and the ionic species are dissolved, said ionic liquid composition is treated to separate the ionic species therefrom before recovering the metal salt.

2. A method of claim 1 wherein the metal salt is one or more alkali metal halides.

3. A method of claim 2 wherein the metal salt is a mixture of LiCl and KCl or a mixture of NaCl and KCl.

4. A method of claim 1 wherein the ionic species comprise one or more species selected from the group consisting of cations of the lanthanides, the alkali metals, and the alkaline earth metals.

5. A method of claim 4 wherein the ionic species comprise one or more cations of Sm, Gd, Cs, Ba and Sr.

6. A method of claim 1 wherein the ionic liquid comprises at least one of a imidazolium halide, a pyridinium halide, or a phosphonium halide, optionally in combination with $AlCl_3$.

7. A method of claim 6 wherein the ionic liquid is 1-ethyl-3-methylimidazolium chloride.

8. A method of claim 6 wherein the ionic liquid is 1-ethyl-3-methylimidazolium chloride in combination with 1-octyl-3-methylimidazolium chloride.

9. A method of claim 6 wherein the metal salt is a mixture of LiCl and KCl or a mixture of NaCl and KCl, and wherein the ionic species comprise one or more species selected from the group consisting of cations of the lanthanides, the alkali metals, and the alkaline earth metals, and wherein the ionic liquid is basic 1-ethyl-3-methylimidazolium chloride-$AlCl_3$ or another basic ionic liquid.

10. A method of claim 1 wherein said ionic liquid composition is treated with one or more of salting out, precipitation method, ion exchange and electrochemical separation.

11. A method of claim 10 wherein the ionic liquid composition contains (a) LiCl and KCl or (b) NaCl and KCl and at least one lanthanide, and wherein the ionic liquid composition is treated to separate the at least one lanthanide therefrom and is subsequently processed to recover the (a) LiCl and KCl or (b) NaCl and KCl, the treatment comprising at least one of the steps of salting out the at least one lanthanide as the chloride or chlorides thereof, precipitating out the at least one lanthanide as the phosphate or phosphates thereof, or electrochemically separating the at least one lanthanide.

12. A method of claim 10 wherein the ionic liquid composition further contains alkali and/or alkaline earth metal halides other than: (a) LiCl and KCl or (b) NaCl and KCl and said alkali and/or alkaline earth metal halides are removed by ion exchange.

13. A method of claim 14 which comprises dissolving said metal halide residue in acidic 1-ethyl-3-methylimidazolium chloride-$AlCl_3$ or another acidic ionic liquid.

14. A method of claim 9 wherein said metal halide is a residue, insoluble in basic-1-ethyl-3-methylimidazolium chloride-$AlCl_3$, remaining after dissolving the metal salt in the basic ionic liquid.

15. A method for removing radioactive contaminants from an alkali metal halide composition used in the reprocessing of nuclear fuel, comprising:

(i) dissolving in an ionic liquid said contaminants to obtain an ionic liquid solution;

(ii) separating said contaminants from the solution by precipitation or electrochemical reduction;

(iii) then optionally removing contaminants remaining in the solution by ion exchange; and (iv) recovering the alkali metal halide composition from the solution and, if necessary, adjusting its composition to the eutectic.

16. A method of claim 15 wherein the ionic liquid is 1-ethyl-3-methylimidazolium chloride or acidic 1-ethyl-3-methylimidazolium chloride-$AlCl_3$.

17. A method of claim 15 wherein a residue comprising alkali and/or alkaline earth metal halides remains undissolved in the ionic liquid, which residue is dissolved in acidic 1-ethyl-3-methylimidazolium chloride-$AlCl_3$ to obtain a mixture from which contaminants are removed by precipitation or electrochemical reduction and/or by ion exchange.

18. A method of claim 15, wherein the recovering of the alkali metal halide composition comprises extracting said alkali metal halide composition into an aqueous medium and then extracting said alkali metal halide composition with a water-insoluble ionic liquid.

19. A method of claim 15, wherein the recovering of the alkali metal halide composition comprises extracting said alkali metal halide composition into an aqueous medium followed by adding a water miscible ionic liquid and removing water.

* * * * *